Feb. 21, 1967  A. J. TEGU  3,305,185
AUTOMATIC FILM REWINDER SHUT-OFF
Filed June 19, 1964  2 Sheets-Sheet 1
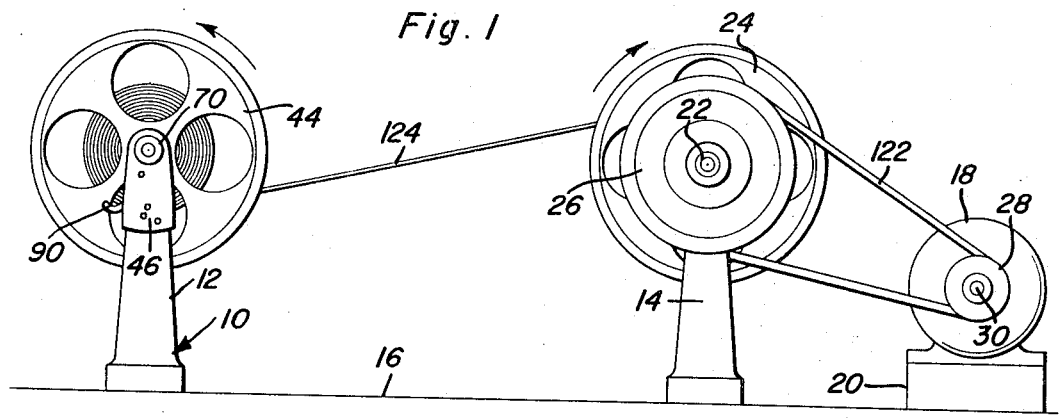
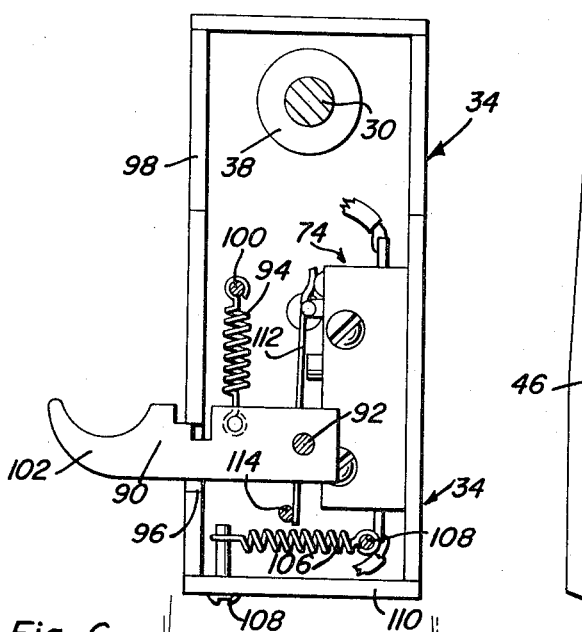
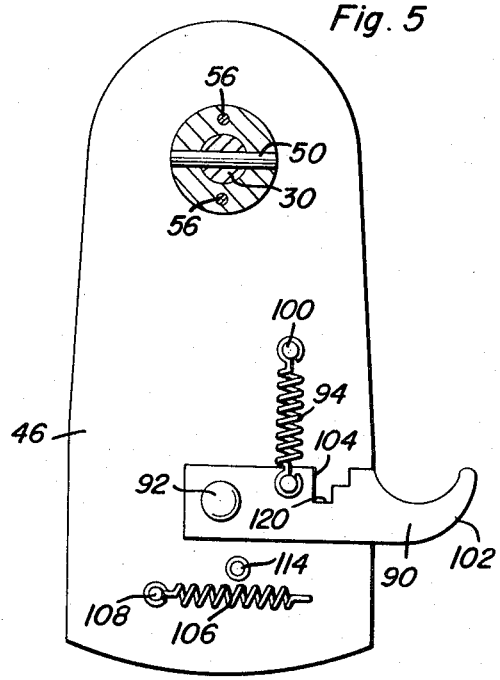
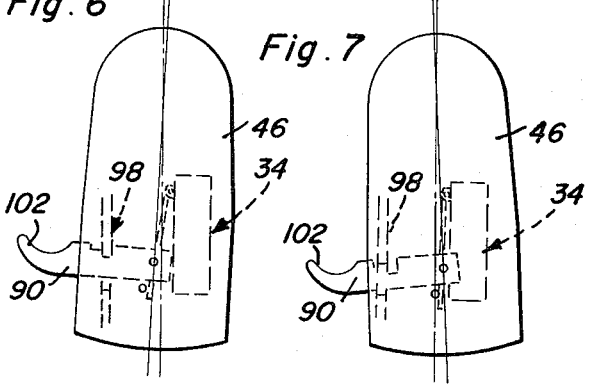
Andrew J. Tegu
INVENTOR.
BY *Clarence A. O'Brien*
*and Harvey B. Jacobson*
Attorneys

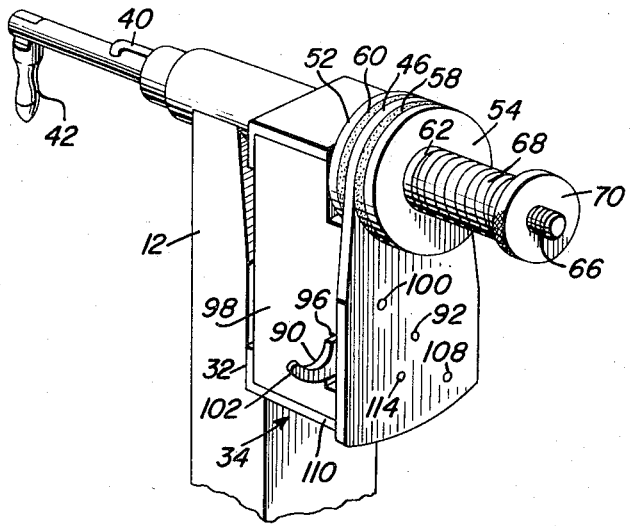
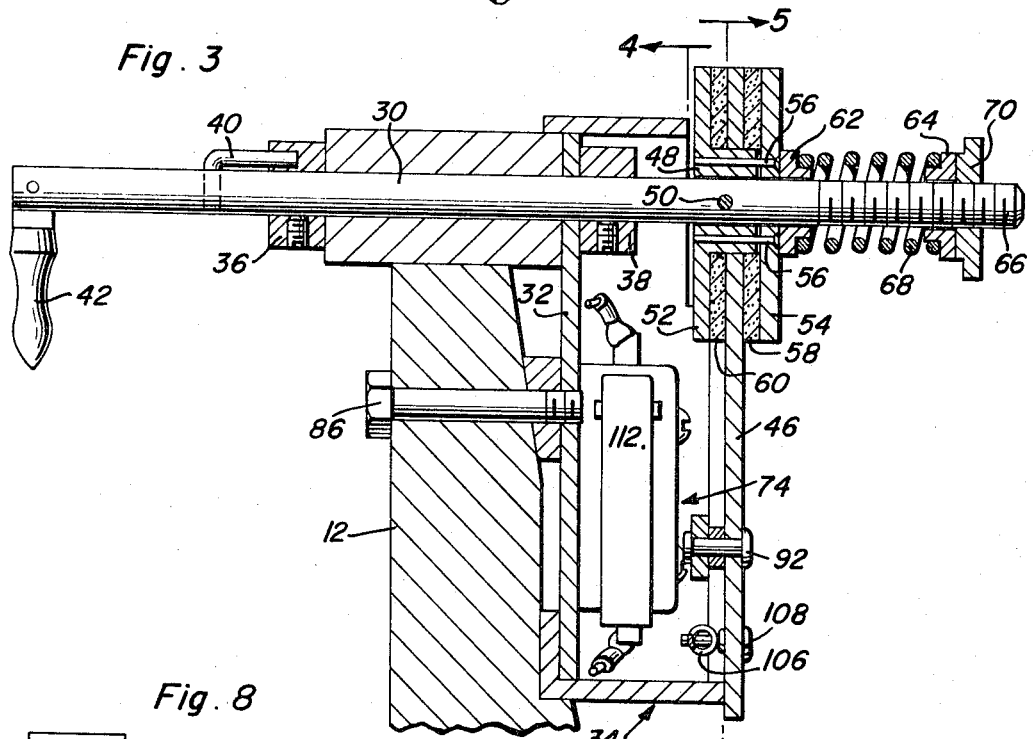

United States Patent Office 3,305,185
Patented Feb. 21, 1967

3,305,185
AUTOMATIC FILM REWINDER SHUT-OFF
Andrew J. Tegu, 23 Underclyffe Road,
St. Johnsbury, Vt. 05819
Filed June 19, 1964, Ser. No. 376,356
8 Claims. (Cl. 242—55.11)

This invention relates to a novel and useful automatic film rewinder shutoff and more specifically to a mechanical apparatus designed to automatically shut-off the drive motor of a film rewinding device.

Film rewinding devices utilized to rewind movie film and the like include a spindle for rotatably supporting a reel of film which is to be rewound and a driven shaft upon which an empty reel is mounted for rotation with the shaft, the two reels being alined in order that the film from the first-mentioned reel may be wound on the second-mentioned reel. Motor means in the form of an electric motor is usually provided for driving the driven shaft and may be actuated to rapidly rewind the film from one reel to the other. However, when the film is rewound on the driven reel, the free end of the film remains loose and whips around as the driven reel continues to rotate at high speed. This whipping action can cause irreparable damage to the free end of the rewound film and while only a short length of the film at the free terminal end thereof is damaged each time the film is rewound, repeated damaging of the free end of a reel of rewound film and the subsequent removal of the damaged end can rapidly result in a considerable length of the film being damaged and removed.

It is therefore the main object of this invention to provide a film rewinding mechanism or apparatus including control means operatively associated with and utilized to apply a drag on the reel from which film is being unwound in order that it will be assured that the film will not be tangled during the rewinding process due to the tension applied on the section of film extending between the two reels. In addition, it is also a portion of the main object of this invention to provide switch means for controlling the operation of an electric motor driving the driven reel including means responsive to termination of torque applied to the reel from which the film is being unwound for opening the electrical circuit by which the electric motor of the rewinding apparatus is motivated thereby terminating operation of the electric motor as soon as the last terminal end portion is unwound from the film supply reel.

Another object of this invention, in accordance with the immediately preceding object, is to provide adjustable friction drag means for resisting rotation of the film supply reel and including means by which the switch means for controlling the electric motor may be readily manually actuated by manipulating readily accessible exterior portions of the friction clutch means operatively associated with the shaft of the film rewinding apparatus upon which the film supply reel is mounted for unwinding the film therefrom.

Still another object of those invention is to provide a film rewinding apparatus including an automatic shut-off for the driving motor thereof constructed in a manner whereby it will be exteremely reliable.

A final object of this invention to be specifically enumerated herein is to provide an automatic film rewinder apparatus including automatic shut-off means constructed in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an automatic film rewinding apparatus constructed in accordance with the present invention;

FIGURE 2 is a perspective view of one portion of the film rewinding apparatus;

FIGURE 3 is a fragmentary enlarged vertical sectional view taken substantially upon a plane passing through the longitudinal centerline of the supply reel supporting shaft of the apparatus illustrated in FIGURE 2;

FIGURE 4 is a vertical sectional view taken substantially upon the plane indicated by the section line 4—4 of FIGURE 3;

FIGURE 5 is a vertical sectional view taken substantially upon the plane indicated by the section line 5—5 of FIGURE 3;

FIGURES 6 and 7 are fragmentray side elevational views of the control means and its associated latch means illustrating the control means and latch means therefor in different positions of operation; and FIGURE 8 is a diagrammatical view showing the wiring circuit of the film rewinder of the instant invention.

Referring now more specifically to the drawings, the numeral 10 generally designates the film rewinding apparatus of the instant invention which may be seen to include a pair of standards 12 and 14 which may be supported from any convenient support surface such as surface 16. In addition, an electric motor 18 is provided and mounted on a base 20 which is also supported from the surface 16.

The standard 14 may be of conventional design and includes a driven shaft 22 which is journaled from the upper end of the standard 14 in any convenient manner and has a film rewinding reel 24 mounted thereon for rotation therewith. It is to be noted that the reel 24 is removably secured on the shaft 22 and that the shaft 22 also has a pulley 26 mounted thereon for rotation therewith which is alined with the driving pulley 28 mounted on the output shaft 30 of the electric motor 18.

With attention now directed more specifically to FIGURES 2–5 of the drawings, it may be seen that a film supply reel mounting shaft 30 is journaled from the upper end of the standard 12 and passes through the rear wall 32 of a control housing generally referred to by the reference numeral 34. A pair of stop collars 36 and 38 are mounted on the shaft 30 for rotation therewith in a conventional manner and are utilized to limit axial shifting of the shaft 30. The end of the shaft 30 remote from the housing 34 is provided with a reel keying member 40 and a pivoted retaining lug 42, the keying member and retaining lug 42 being of conventional design and adapted to receive the film supply reel 44 therebetween with the keying member 40 keyed to the reel 44 and the pivoted retaining member 42 preventing axial displacement of the film supply reel 44 outwardly of the corresponding end of the shaft 30.

The front wall of the housing 34 is referred to by the reference numeral 46 and is journaled on a sleeve member 48 mounted on the shaft 30 and keyed thereto by means of a pin 50. The front wall or lever 46 is oscillatable about the longitudinal axis of the shaft 30 relative to the latter and to the remainder of the housing 34.

The sleeve 48 includes a backing disc portion 52 and a thrust disc 54 is disposed concentrically on the shaft 30 and coupled to the end of the sleeve 48 remote from the backing disc 52 by means of pins 56. The lever arm 46 is disposed between the discs 52 and 54 and it may be seen that a pair of leather discs 58 and 60 are mounted on the sleeve 48 on opposite sides of the lever arm 46 and between the latter and the discs 52 and 54. A thrust washer 62 is also disposed on the shaft 30 and is free to rotate relative to the latter while a second thrust washer 64 is mounted on an externally threaded terminal end portion 66 of the shaft 30. A compression spring 68 is disposed between the washers 62 and 64 and an adjusting nut 70 is threadedly engaged with the threaded portion 68 of the shaft 30 so as to compress the compression spring 68 thereby causing the lever arm 46 to be gripped between the leather discs 58 and 60, the latter being engaged with the discs 52 and 54 and thereby rotating with the shaft 30 relative to the lever arm 46 and applying torque to the lever arm 46. Accordingly, it may be seen that rotation of the film supply reel 44 in a counterclockwise direction as viewed in FIGURE 1 of the drawings will have a tendency to swing the lever arm 46 from the position illustrated in FIGURE 6 of the drawings to the position illustrated in FIGURE 7 of the drawings.

A microswitch assembly generally referred to by the reference numeral 74 is mounted on the back wall 32 of the housing 34 and is serially connected in a first conductor 76 extending from one terminal 78 of the electric motor 18 to the source of electrical potential 80, there also being a conductor 82 extending from the other terminal 84 of the motor 18 to the source 80 of electrical potential.

The housing 34 is also supported from the standard 12 by means of a suitable fastener 86 extending through the standard 12 and threadedly engaged with the back wall 32 of the housing 34. In addition, it may be seen that a latch arm 90 is pivotally secured to the rear surface of the front wall 46 by means of a pivot pin 92 and that an expansion spring 94 is secured between the free end of the latching lever or arm 90 which projects through the slot 96 in the side wall 98 of the housing 34 and the anchor pin 100 is secured to the lever arm. Thus, it may be seen that the extended end portion 102 of the latching lever 90 is yieldingly urged to an uppermost position with the portion of the side wall 98 defining the slot or opening 96 engaged in the stepped recess 104 formed in the latching lever 90. Still further, an expansion spring 106 is secured between a second anchor pin 108 carried by the lever arm 46 and an anchor pin 109 carried by the bottom wall 110 of the housing 34, the expansion spring 106 yieldingly urging the lever arm 46 from the position illustrated in FIGURE 7 of the drawings to the position illustrated in FIGURE 6 of the drawings. The microswitch 74 may be of any conventional type such as the Westinghouse Unimax microswitch No. Y55879 which includes a spring-mounted actuating arm 112. The microswitch 74 is normally in the off position with the electric motor 18 rendered inoperative. The lever arm 46 includes an actuating pin 114 which is engageable with the actuating arm 112 when the lever arm 46 is in the position illustrated in FIGURE 7 of the drawings. However, the expansion spring 106 yieldingly urges the lever arm 46 to the position illustrated in FIGURE 6 of the drawings with the actuating pin 114 out of engagement with the actuating arm 112.

The position of the latching lever 90 in FIGURE 4 of the drawings is represented by an intermediate position of the lever arm 46 and it may be seen from FIGURE 6 of the drawings that when the lever arm 46 returns to its rest position by means of the spring 106 that the latching lever 90 will have the deep step 120 registered with the upper portion of the opening 96 and therefore that the latching lever 90 may have its free end swung to its uppermost position by means of the expansion spring 94. With the deep step 120 engaged with the side wall 98, the lever arm 46 may not be pivoted to the position illustrated in FIGURE 7 of the drawings wherein the microswitch 74 is actuated to complete the circuit to the electric motor 18. However, if the free end of the latching lever 90 is urged downwardly the lever arm 46 may then be swung to the position illustrated in FIGURE 7 of the drawings so as to initiate operation of the motor 18 which will in turn, by means of the endless belt 122, drive the shaft 22 on which the rewinding reel 24 is mounted. Therefore, the film 124 will begin to be unwound from the film supply reel 44 and rewound on the reel 24. Initial rotation of the film supply reel 44 will, by means of the clutch assembly defined by the discs 52, 54, 58 and 60, transfer sufficient torque to the lever arm 46 to overcome the tension of the expansion spring 106 and maintain the lever arm 46 in the position illustrated in FIGURE 7 of the drawings with the microswitch 74 in the on position. However, as soon as soon as all of the film 124 is unwound from the film supply reel 44, no further torque will be applied to the lever arm 46 and the expansion spring 106 will then be capable of returning the lever arm 46 to the position illustrated in FIGURE 6 of the drawings whereupon the actuating arm 112 will return to its off position terminating operation of the motor 18.

The amount of torque transferred from the shaft 30 to the lever arm 46 may of course be adjusted by means of the nut 70 and therefore it may be seen that the film rewinding apparatus 10 of the instant invention is constructed in a manner whereby the driving motor 18 thereof may be immediately rendered inoperative as soon as all of the film 124 has been unwound from the film supply reel 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic film rewinder shut-off comprising support means, a support shaft journaled from said support means and adapted to have a supply reel mounted thereon for rotation therewith, switch means supported by said support means adapted to control motor means drivingly connected to a wind-up reel operatively associated with said supply reel for unwinding material wound on said supply reel and winding said material on said wind-up reel, said switch means including a movable actuator yieldingly urged toward an off position adapted to terminate operation of said motor means and movable to an on position adapted to effect operation of said motor means, control means journaled from said support means for oscillation between first and second positions about an axis coinciding with the axis of rotation of said shaft, said first position of said control means being an on position engaged with said actuator with the latter urged by said control means to its on position and said second position being an off position allowing said actuator to return to its off position, means yieldingly urging said control means to its off position, adjustable friction clutch means operatively connected between said shaft and said control means operable to retain said control means in its on position in response to rotation of said support shaft in one direction, latch means movably supported from said support means and shiftable between a first operative position and a second inoperative position, said latch means, when in its operative position while said control means is in its second position, defining a latching connection between said support means and said control means preventing movement of said control means to its first position, and means yieldingly urging said latch means to its operative position.

2. An automatic film rewinder shut-off comprising support means, a support shaft journaled from said support means and adapted to have a supply reel mounted thereon for rotation therewith, switch means supported by said support means adapted to control motor means drivingly connected to a wind-up reel operatively associated with said supply reel for unwinding material wound on said supply reel and winding said material on said wind-up reel, said switch means including a movable actuator yieldingly urged toward an off position adapted to terminate operation of said motor means and movable to an on position adapted to effect operation of said motor means, control means movably supported from said support means for movement between first and second positions, said first position of said control means being an on position engaged with said actuator with the latter urged by said control means to its on position and said second position being an off position allowing said actuator to return to its off position, means yieldingly urging said control means to its off position, and adjustable torque transmitting means operatively connected between said shaft and said control means operable to retain said control means in its on position in response to rotation of said support shaft in one direction, latch means movably supported from said support means and shiftable between a first operative position and a second inoperative position, said latch means, when in its operative position while said control means is in its second position, defining a latching connection between said support means and said control means preventing movement of said control means to its first position, and means yieldingly urging said latch means to its operative position.

3. An automatic film rewinder shut-off comprising support means, a support shaft journaled from said support means and adapted to have a supply reel mounted thereon for rotation therewith, switch means supported by said support means adapted to control motor means drivingly connected to a wind-up reel operatively associated with said supply reel for unwinding material wound on said supply reel and winding said material on said wind-up reel, said switch means including a movable actuator yieldingly urged toward an off position adapted to terminate operation of said motor means and movable to an on position adapted to effect operation of said motor means, control means movably supported from said support means for movement between first and second positions, said first position of said control means being an on position engaged with said actuator with the latter urged by said control means to its on position and said second position being an off position allowing said actuator to return to its off position, means yieldingly urging said control means to its off position, and adjustable torque transmitting means operatively connected between said shaft and said control means operable to retain said control means in its on position in response to rotation of said support shaft in one direction, and latch means operatively connected between said support means and said control means releasably securing said control means in its second position.

4. The combination of claim 1 wherein said control means comprises a lever arm including first and second end portions, one of said end portions being journaled on said shaft and the other end portion including means disposed for engagement with said actuator, said clutch means including friction plate means mounted on said shaft for rotation therewith and on opposite sides of said one end portion of said lever arm and including a friction connection with said lever arm.

5. The combination of claim 4 including a pair of friction discs journaled from said shaft between said lever arm and said friction plate means, one of said plate means being mounted on said shaft against axial displacement therealong in a direction away from the other of said plate means and the other of said plate means being mounted on said shaft for axial displacement therealong, and means connected between said shaft and said other plate means yieldingly urging said other plate means toward said one plate means.

6. The combination of claim 3 wherein said control means comprises a lever arm including first and second end portions, one of said end portions being journaled on said shaft and the other end portion including means disposed for engagement with said actuator, said clutch means including friction plate means mounted on said shaft for rotation therewith and on opposite sides of said one end portion of said lever arm and including a friction connection with said lever arm, said latch means comprising a lever pivotally supported from said control means for movement therewith and including a portion engageable with said support when said latch means is in its operative position to prevent movement of said control means to its first position.

7. The combination of claim 2 wherein said latch means is of the automatic resetting type and is operable to return to its latching connection defining position automatically upon movement of said control means to said second position thereof.

8. The combination of claim 7 wherein said latch means and said support means include coacting means preventing return of said latch means to its operative position when said control means is in its first position.

References Cited by the Examiner
UNITED STATES PATENTS

| | | | |
|---|---|---|---|
| 1,484,545 | 2/1924 | Aspley | 242—57 |
| 1,747,895 | 2/1930 | Fulton | 242—55.11 |
| 1,863,980 | 6/1932 | Goldberg | 242—55.11 |
| 2,583,675 | 1/1952 | Waggoner | 242—57 |

STANLEY N. GILREATH, *Primary Examiner.*

GEORGE F. MAUTZ, *Examiner.*